C. F. GOLDEN.
FLAGSTAFF.
APPLICATION FILED JAN. 12, 1909.
1,002,260.
Patented Sept. 5, 1911.
2 SHEETS—SHEET 1.
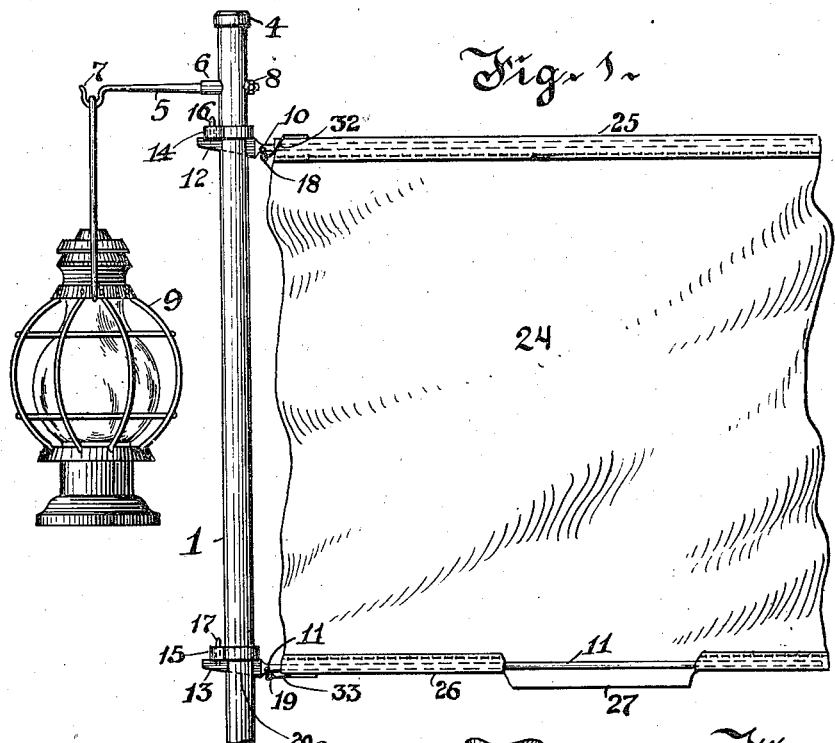
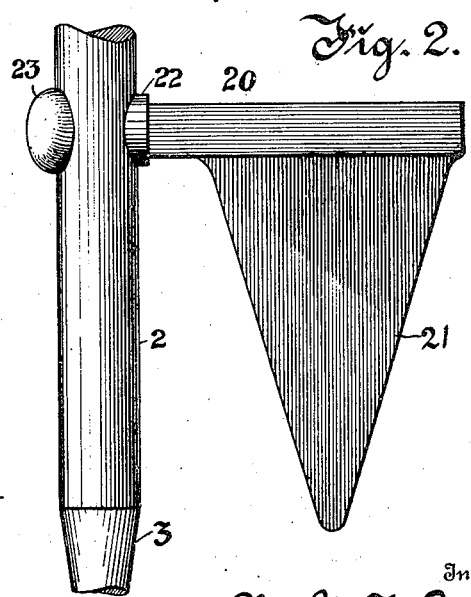
Witnesses
H. Lowenstein.
James H. Marr
Inventor
Charles F. Golden
By Edward E. Clement
Attorney C. F. GOLDEN.
FLAGSTAFF.
APPLICATION FILED JAN. 12, 1909.
1,002,260.
Patented Sept. 5, 1911.
2 SHEETS—SHEET 2.
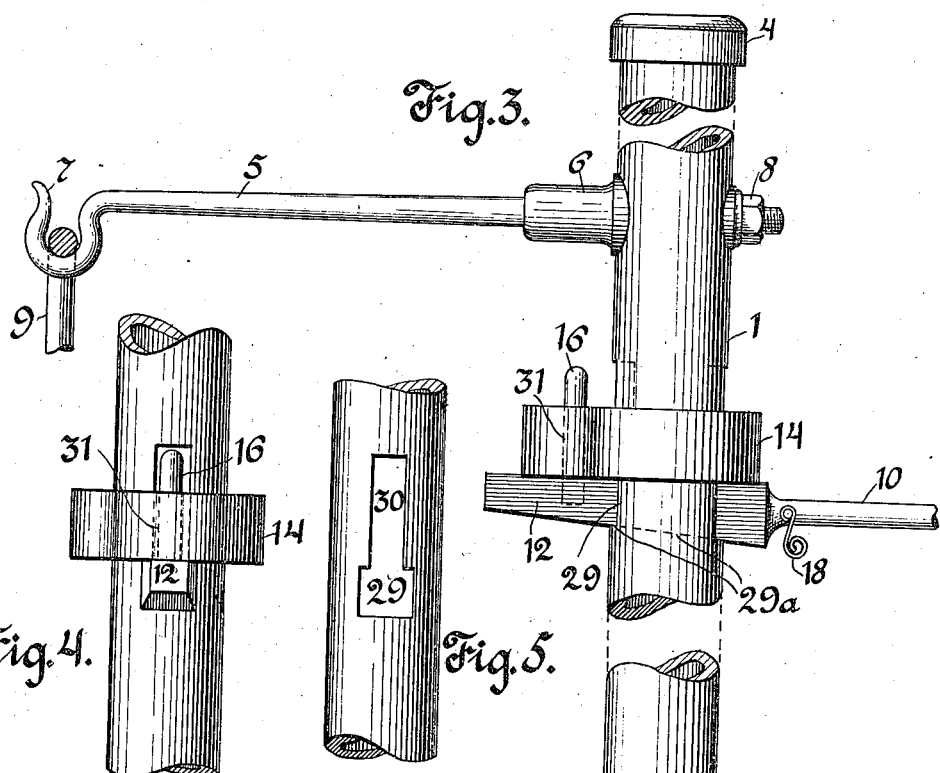
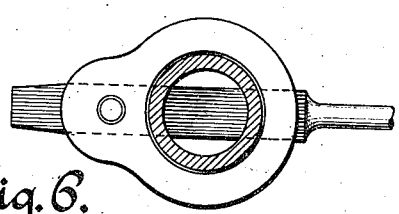
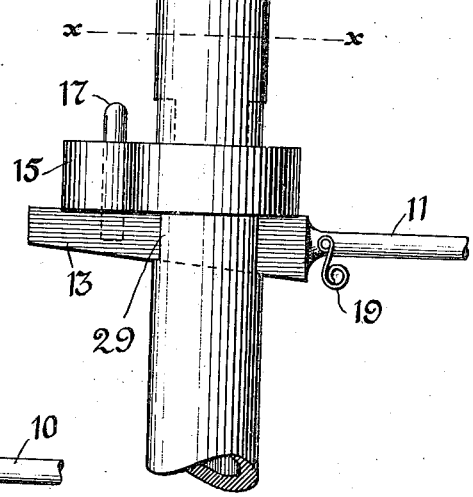
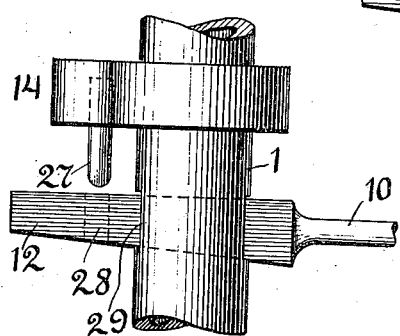
Witnesses
H. Löwenstein.
James H. Marr.
Inventor
Charles F. Golden
By Edward E. Clement
Attorney

UNITED STATES PATENT OFFICE.

CHARLES FREMONT GOLDEN, OF LA FAYETTE, INDIANA.

FLAGSTAFF.

1,002,260.  Specification of Letters Patent.  Patented Sept. 5, 1911.

Application filed January 12, 1909. Serial No. 471,849.

*To all whom it may concern:*

Be it known that I, CHARLES F. GOLDEN, a citizen of the United States, residing at La Fayette, in the county of Tippecanoe and State of Indiana, have invented certain new and useful Improvements in Flagstaffs, of which the following is a specification, reference being had therein to the accompanying drawing.

My invention relates to signaling devices, and especially to flag staffs.

It has for its object the production of an improved staff for railway approaching signal work.

Briefly stated, the invention comprises a tubular metal standard or pole with a solid pointed foot adapted to be driven into the ground, and provided with means to hold it against turning, detachable and adjustable supporting means for a flag, and further supporting means for a lantern.

The various features of invention involved will sufficiently appear from the following detailed description, and the claims appended thereto.

My invention is illustrated in the accompanying drawings, in which:

Figure 1 is a side view of the complete structure with a flag and lantern both in place. Fig. 2 is a side view upon an enlarged scale of a holding device for the foot. Fig. 3 is a side view on an enlarged scale of the upper part of the structure, showing the details of the devices for supporting the flag and lantern. Fig. 4 is a view from the left of Fig. 1 showing details of the locking means for the flag arms. Fig. 5 is a similar view of a portion of the staff showing the socket for the arms. Fig. 6 is a section on the line x—x of Fig. 3 looking downward, and Fig. 7 is a side view of a modified form of locking device.

Referring to the drawings, the staff 1 consists of a metal tube, fitted with a solid foot 2, pointed as shown at 3 so that it may be readily driven into the ground. In order to assist in planting the foot, as well as to prevent its turning when planted, I provide the lateral stud 20 forming a foot-hold shouldered at 22, and preferably upset and riveted at 23. This structure is strong enough to permit the staff being forcibly driven into frozen ground without injury to any part of the structure. Formed upon this stud and extending downward therefrom is a blade or tooth 21, which is forced into the ground after the point 3 has entered to a sufficient distance, and acts as a steadying device to prevent turning.

Spaced apart a distance corresponding to the width of the flags to be employed, are two or more slots 29 (best shown in Figs. 4 and 5) cut through both sides of the pole, but deeper on one side than the other, so as to produce in effect an inclined lower edge 29ª. The two arms 10 and 11 are made of substantially the same length as the flag, and have key or wedge-shaped butts, adapted to enter the slots 29. The lower edges of these are inclined to match the inclination in the edges of the slots, so that when they are forced in and held against retraction, a joint is produced that is at once solid and simple. Upon the end of each key butt is secured a pin 16 or 17, for locking purposes. Sliding on the staff are a pair of locking rings 14 and 15, having laterally spaced openings 31 adapted to receive the pins 16 and 17. Each slot 29 is provided with a vertical extension 30 of sufficient width to pass the pin on its key. Above the uppermost slot I provide an opening whose axis is parallel to the axes of the slots 29, and through this opening I pass the stem of an arm 5 shouldered at 6, threaded to receive a nut or washer 8, and provided with a terminal hook 7 for the lantern or other night signal 9.

When flags of different widths are to be used, the arms are set accordingly, the upper slot being used for the upper arm, and either one of the lower slots for the lower arm. Such variable position of the lower arm is indicated in dotted lines in Fig. 1. As the rings 14 and 15 slide freely upon the staff, they may be used interchangeably to secure the butts of the arms in any of the slots.

The operation of this device is almost obvious from the drawings. In order to detach the arms, the rings 14 and 15 are lifted so as to disengage the pins 16 and 17, when the butts 12 and 13 can be withdrawn from the slots. The staff can be used as a night signal staff only, by simply leaving off the arms. In assembling, each ring 14 or 15 is lifted, the corresponding butt 12 or 13 inserted, and the ring dropped over the pin 16 or 17, whereby each arm is securely locked in position.

The flag is secured upon the arms by means of a suitable tubular hem or pocket on each edge, as indicated in 25 and 26, a portion of the lower flap being turned down at 27 to show the arm 11. Clips 18 and 19 are permanently attached to the arms to receive retaining cords or tapes 32—33.

In the modification shown in Fig. 7, the pin 27 is mounted on the ring 14, and the opening 28 is produced in the butt of the arm. This enables me to dispense with the extension slots 30. The use of this arrangement or the other, is optional, both making efficient joints.

The top of the staff is finished with a cap 4, which closes and protects the interior, and the outside may be coated if desired with any suitable material, such as nickel, or copper. If the staff is made of iron, it may be japanned, copper plated, or otherwise finished so as to be weather-proof and capable of withstanding the somewhat severe usage to which appliances of this character are subject.

Having thus described my invention what I claim and desire to secure by Letters Patent of the United States is:

1. A portable knock down signal standard comprising a metal tube having a transverse slot through its walls, a detachable metal supporting arm having a butt adapted to slide in and out of said slot, and means carried upon the tube to lock the butt therein, together with a flag fitted to the supporting arm.

2. A portable knock down signal standard comprising a transversely slotted metal tube, a detachable metal arm having its butt shaped to slide in and out of the slot through the tube and a locking ring on the tube adapted to engage the short projecting end of the butt when in position, together with a flag fitted to the supporting arm.

3. A portable knock down signal standard comprising a metal tube with transverse slots through its walls spaced apart from each other, a pair of rigid arms fitted to be received in said slots, locking means for the arms, and a flag with holding means to engage both arms.

4. A portable knock down signal standard comprising a metal body, detachable parallel metal arms spaced apart from each other and rigidly attached to the body with means to hold a flag extended between them, a foot adapted to be forced into the earth or other medium, and means carried by the body to prevent the staff from turning when thus placed in position.

5. A knock down portable signal standard comprising the following instrumentalities: a staff or body, transverse tapering slots in said body, a pair of rigid detachable arms having their butt ends tapering to fit tightly in said slots, a pair of rings sliding on the staff with means to engage the butts of the arms to prevent their withdrawal from the slots, means at the ends of the staff to prevent the loss of the rings therefrom, and a flag formed of flexible material with securing means whereby it may be attached to and stretched between the parallel arms.

6. A portable knock down signal standard comprising a metal staff with a plurality of transverse slots spaced apart from each other, rigid detachable arms fitted to be received interchangeably in any of said slots and locking means for the arms when in position, whereby the staff may be adapted to hold flags of varying sizes.

In testimony whereof I affix my signature in presence of two witnesses.

CHARLES FREMONT GOLDEN.

Witnesses:
ALICE E. KNELLING,
SARAH E. SMITH.